United States Patent
Choi et al.

(10) Patent No.: US 10,704,647 B2
(45) Date of Patent: Jul. 7, 2020

(54) TENSION CONTROLLING APPARATUS FOR CATENARY STRUCTURE EQUIPMENT

(71) Applicant: Sung Chan Kim, Gunpo-si, Gyeonggi-do (KR)

(72) Inventors: Se Hyun Choi, Seoul (KR); Jeong Hwan Kim, Gwangmyeong-si (KR); Sung Chan Kim, Gunpo-si (KR)

(73) Assignee: Sung Chan Kim, Gunpo-si, Gyeonggi-do (KR)

( * ) Notice: Subject to any disclaimer, the term of this patent is extended or adjusted under 35 U.S.C. 154(b) by 424 days.

(21) Appl. No.: 15/865,289

(22) Filed: Jan. 9, 2018

(65) Prior Publication Data

US 2018/0216701 A1 Aug. 2, 2018

(30) Foreign Application Priority Data

Feb. 1, 2017 (KR) .................. 10-2017-0014316

(51) Int. Cl.
| | |
|---|---|
| *F16G 11/12* | (2006.01) |
| *H02G 1/08* | (2006.01) |
| *H02G 1/04* | (2006.01) |
| *B60M 1/26* | (2006.01) |

(52) U.S. Cl.
CPC ............. *F16G 11/12* (2013.01); *H02G 1/081* (2013.01); *B60M 1/26* (2013.01); *H02G 1/04* (2013.01)

(58) Field of Classification Search
CPC .......... F16G 11/12; H02G 1/081; H02G 1/04; H02G 7/02; H02G 7/05; E04B 1/26; E04B 1/56; E04B 1/58
See application file for complete search history.

(56) References Cited

U.S. PATENT DOCUMENTS

2005/0235594 A1* 10/2005 Hildreth .................... E04B 1/24
52/633

FOREIGN PATENT DOCUMENTS

| JP | 2000-154593 A | 6/2000 |
|---|---|---|
| KR | 10-0888211 B1 | 3/2009 |

* cited by examiner

*Primary Examiner* — Daniel J Wiley
(74) *Attorney, Agent, or Firm* — Revolution IP, PLLC

(57) ABSTRACT

A tension controlling apparatus for catenary structure equipment, which adjusts tension of a horizontal wire horizontally arranged between two main pole units installed leaving a certain distance includes a starter unit which is connected to a first main pole unit of the two main pole units, and connects with a first end of the horizontal wire; and a turnbuckle unit which is connected to a second main pole unit of the two main pole units, connects with a second end of the horizontal wire, and adjusts the tension of the horizontal wire.

11 Claims, 7 Drawing Sheets

[FIG. 1]
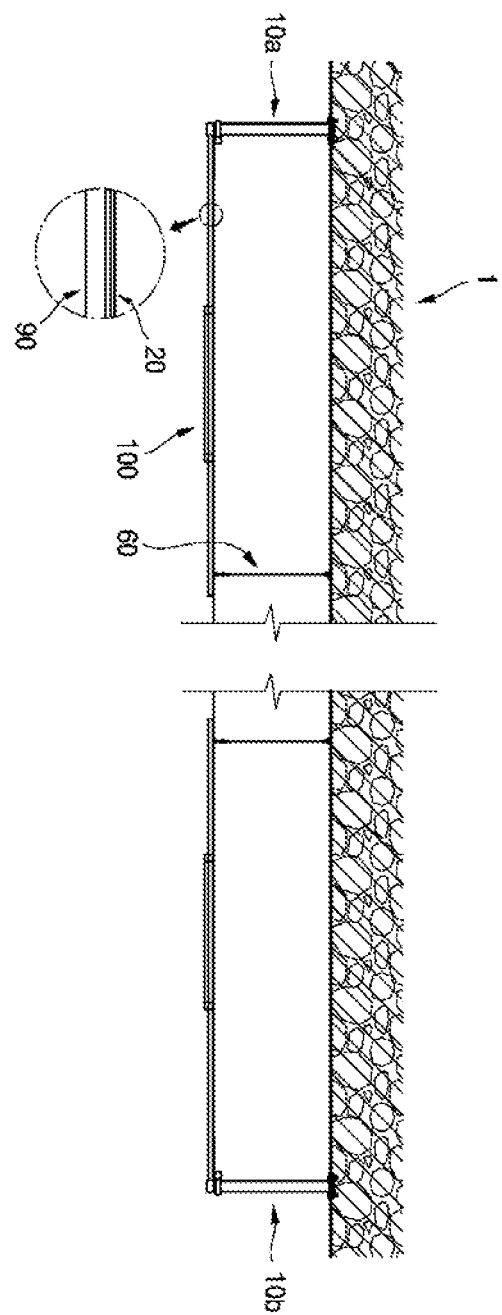

[FIG. 2]
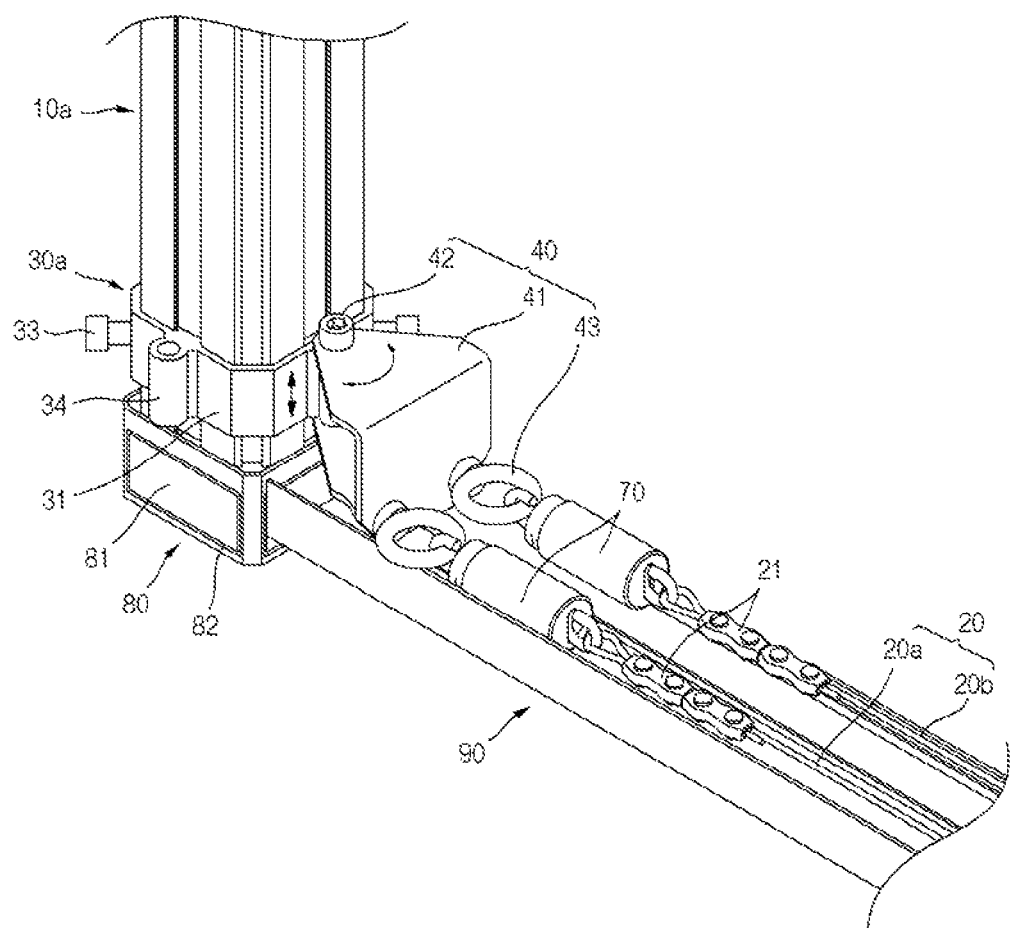
[FIG. 3]
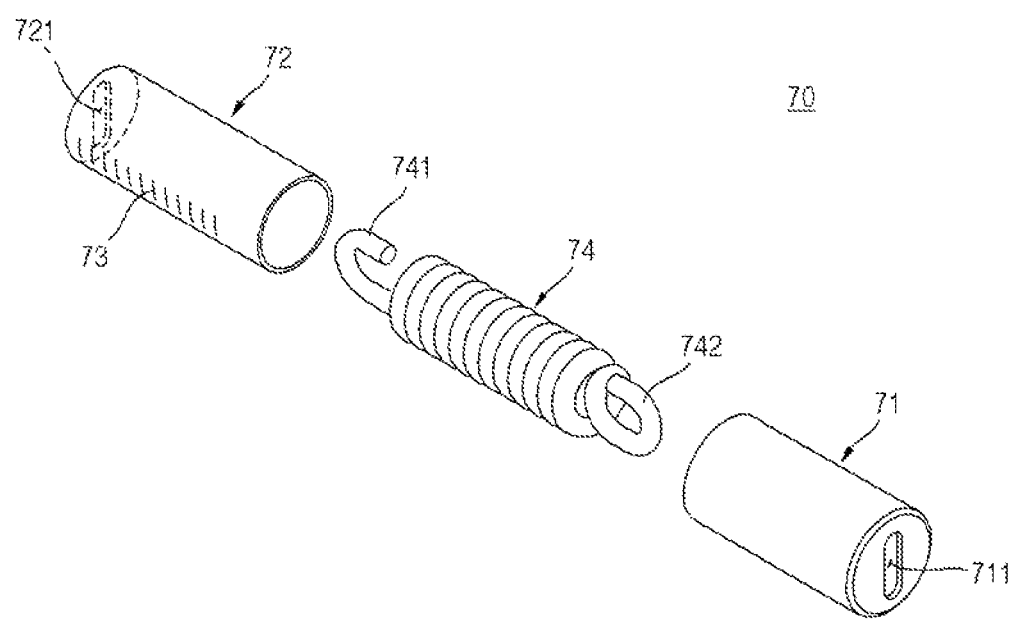

[FIG. 4]
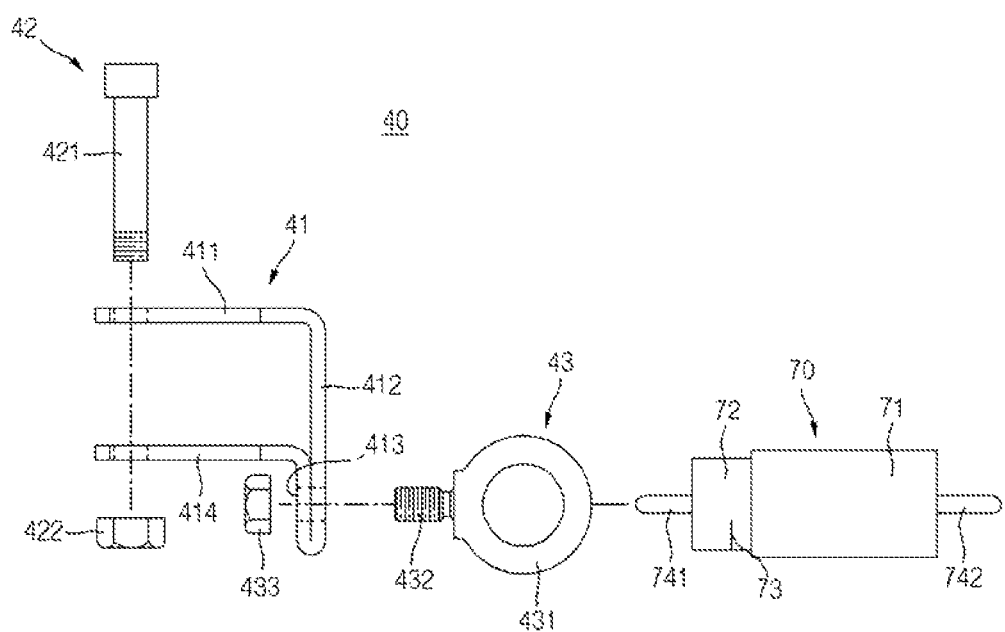

[FIG. 5]
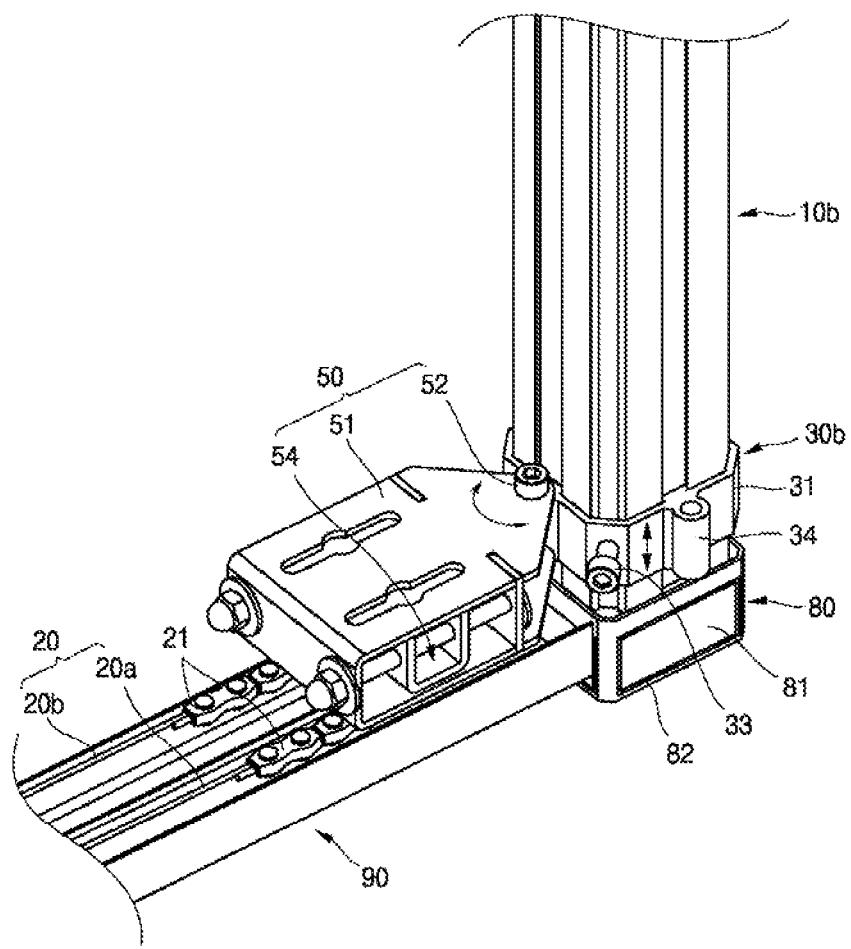

[FIG. 6]
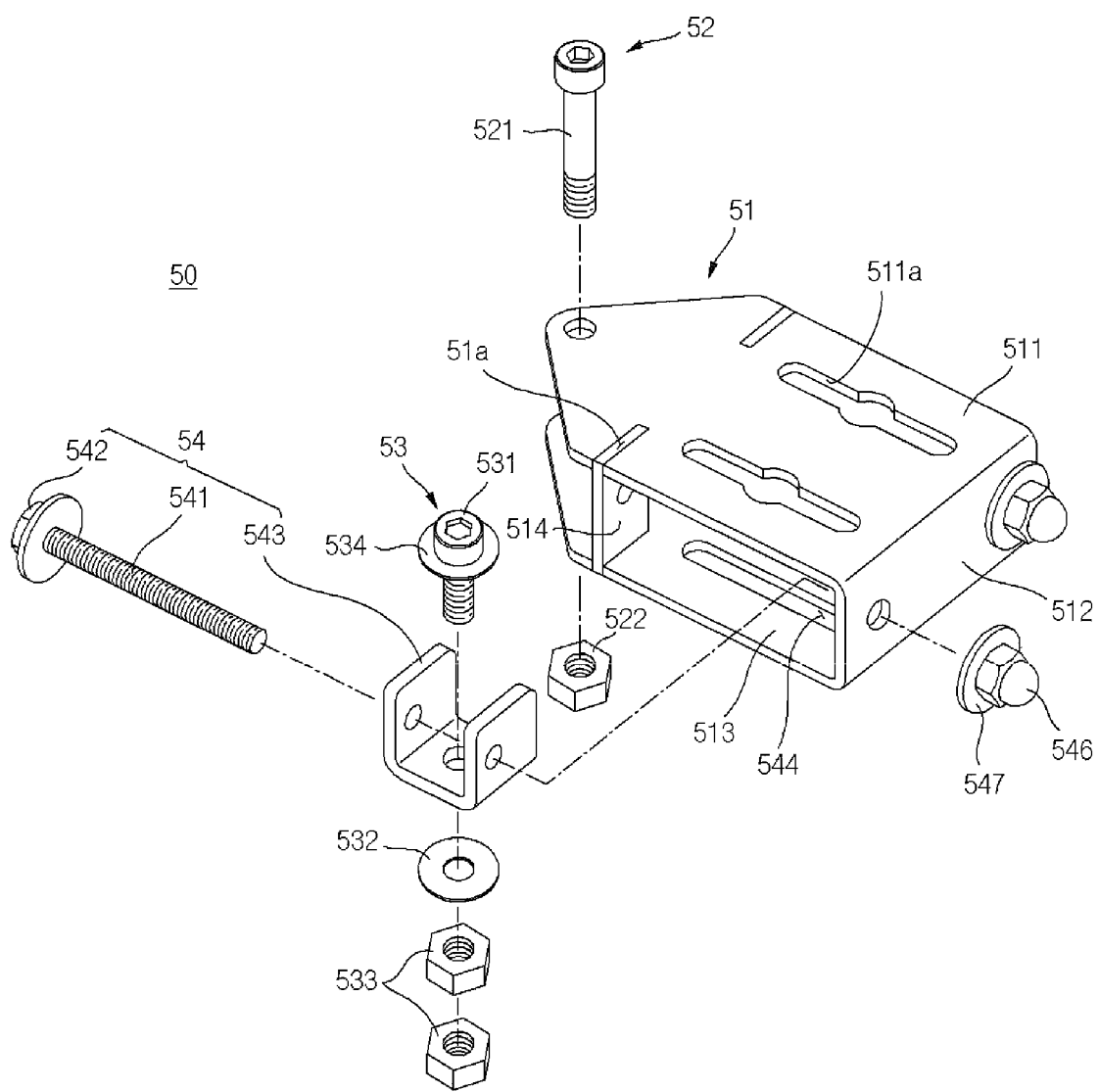

[FIG. 7]
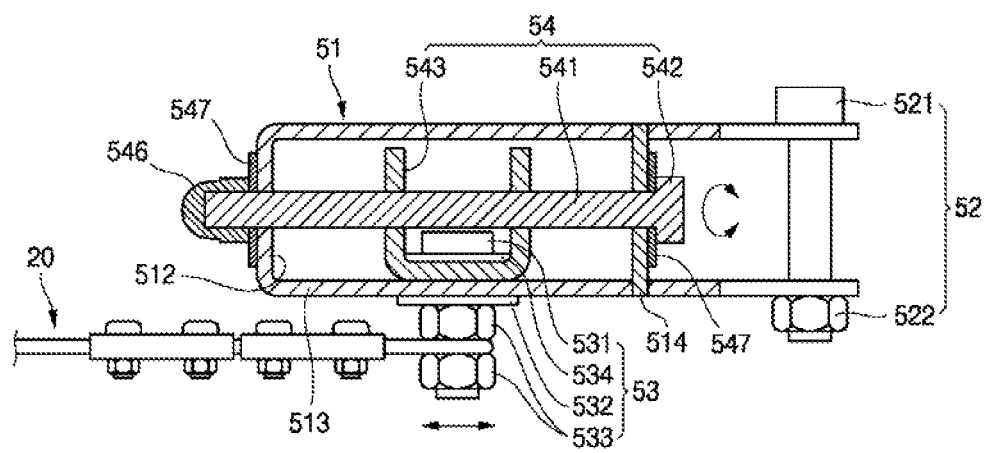
[FIG. 8]
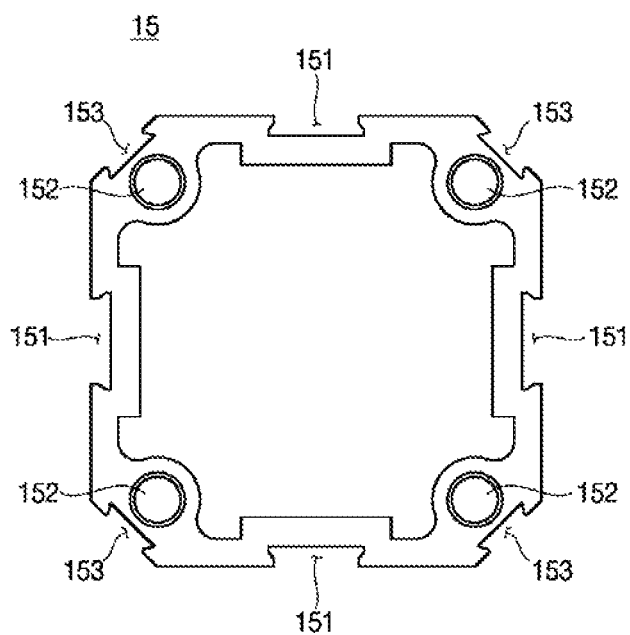

[FIG. 9]
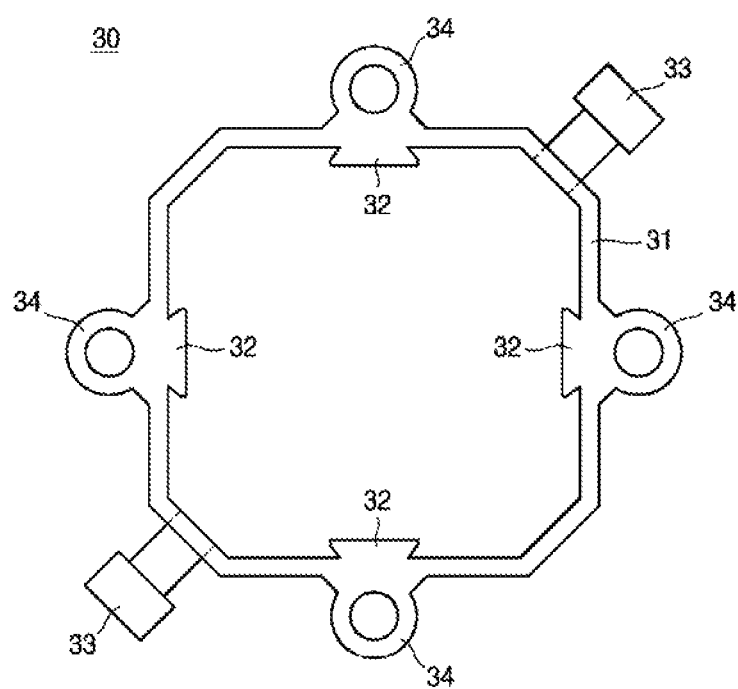

TENSION CONTROLLING APPARATUS FOR CATENARY STRUCTURE EQUIPMENT

CROSS-REFERENCE TO RELATED APPLICATION

This application claims priority from Korean Patent Application No. 10-2017-0014316, filed on Feb. 1, 2017 in the Korean Intellectual Property Office, the disclosure of which is incorporated herein by reference.

BACKGROUND OF THE INVENTION

(a) Field of the Invention

The present disclosure relates to a tension controlling apparatus for catenary structure equipment, and more particularly to a tension controlling apparatus for catenary structure equipment, which can adjust tension of horizontal wires horizontally arranged between two adjacent main pole units.

(b) Description of the Related Art

In general, a raceway refers to a kind of duct for electric wiring often installed on an exposed ceiling of a parking lot, a machine room or the like in a large concrete structure. The raceway is installed on a floor plate, a wall, a ceiling, etc. as exposed.

For example, a hanger is anchored to an indoor ceiling, and then the raceways are hung on a lower end of the hanger so that the hanger can support the load of the raceways.

However, when an earthquake and the like shaking happens, a conventional raceway installation structure cannot absorb such a shaking, and therefore the hanger may be separated from the ceiling or an intense shaking may cause the raceway to be separated from the hanger.

Further, the raceway is coupled according to the positions of the hangers, and it is thus difficult to change a position where the raceway is arranged.

SUMMARY OF THE INVENTION

Accordingly, the present disclosure is conceived to solve the conventional problems, and an aspect of the present disclosure is to provide a tension controlling apparatus for catenary structure equipment, which can adjust tension of horizontal wires horizontally arranged between two main pole units.

According to an aspect of the present disclosure, there is provided a tension controlling apparatus for catenary structure equipment, which adjusts tension of a horizontal wire horizontally arranged between two main pole units installed at a certain distance, the tension controlling apparatus including: a starter unit which is connected to a first main pole unit of the two main pole units, and connects with a first end of the horizontal wire; and a turnbuckle unit which is connected to a second main pole unit of the two main pole units, connects with a second end of the horizontal wire, and adjusts the tension of the horizontal wire.

The turnbuckle unit may includes a turnbuckle bracket configured to be connected to the second main pole unit; a turnbuckle connection member configured to move forward and backward in the turnbuckle bracket along a lengthwise direction of the horizontal wire and connect with the horizontal wire; and a tension adjuster configured to couple with the turnbuckle bracket, and move the turnbuckle connection member along the lengthwise direction of the horizontal wire to adjust the tension of the horizontal wire.

The tension controlling apparatus for the catenary structure equipment may further include a damper unit configured to connect a first side of the horizontal wire and the starter unit and adjust the tension of the horizontal wire.

The damper unit may include a damper spring configured to connect the horizontal wire and the starter unit; a first cylinder configured to be supported at a first side of the damper spring; a second cylinder configured to be supported at a second side of the damper spring and inserted to slide in the first cylinder; and a scale mark configured to be formed on a circumferential surface of the second cylinder to check, correct and manage a stretched extent of the damper spring.

The tension adjuster may include an adjustment screw configured to rotatably couple with the turnbuckle bracket; a screw turning part configured to couple with the adjustment screw to turn the adjustment screw; and a nut bracket configured to screw-couple with the adjustment screw as coupling with the turnbuckle connection member.

The turnbuckle bracket may include a tension adjustment slit configured to penetrate therethrough to allow the turnbuckle connection member move forward and backward.

The turnbuckle bracket may include a first turnbuckle plate configured to be connected to the second main pole unit; a second turnbuckle plate configured to be bent from the first turnbuckle plate and support a first side of the adjustment screw to be rotatable; a third turnbuckle plate configured to be bent from the second turnbuckle plate and parallel with the first turnbuckle plate, be connected to the second main pole unit, and including the tension adjustment slit penetrating therethrough; and a fourth turnbuckle plate configured to connect the first turnbuckle plate and the third turnbuckle plate to face the second turnbuckle plate, and support a second side of the adjustment screw to be rotatable.

The tension controlling apparatus may further include a turnbuckle branch member configured to be connected to and slide up and down in the second main pole unit, and couple with the turnbuckle unit.

The turnbuckle unit may further include a turnbuckle shaft member configured to make the turnbuckle bracket be connected to the turnbuckle branch member at various angles in a horizontal direction.

The starter unit may include a starter bracket configured to be connected to the first main pole unit; and a starter connection member configured to couple with the starter bracket and connect with the horizontal wire.

The starter bracket may include a first starter plate configured to be connected to the first main pole unit; a second starter plate configured to be bent from the first starter plate; and a fourth starter plate configured to be bent from the second starter plate and parallel with the first starter plate, and be connected to the first main pole unit.

The tension controlling apparatus may further include a starter branch member configured to be connected to and slide up and down in the first main pole unit, and couple with the starter unit.

The starter unit may further include a starter shaft member configured to make the starter bracket be connected to the starter branch member at various angles in a horizontal direction.

BRIEF DESCRIPTION OF THE DRAWINGS

The above and/or other aspects of the present disclosure will become apparent and more readily appreciated from the following description of the exemplary embodiments, taken in conjunction with the accompanying drawings, in which:

FIG. 1 is a view of showing catenary structure equipment according to one embodiment of the present disclosure;

FIG. 2 is an enlarged perspective view of a portion where a main pole unit, a branch unit, a starter unit, and a horizontal wire are coupled according to one embodiment of the present disclosure;

FIG. 3 is a view of showing an alternative example of a damper unit according to one embodiment of the present disclosure;

FIG. 4 is an exploded view of the starter unit according to one embodiment of the present disclosure;

FIG. 5 is an enlarged perspective view of a portion where the main pole unit, the branch unit, a turnbuckle unit and the horizontal wire are coupled according to one embodiment of the present disclosure;

FIG. 6 is an exploded view of the turnbuckle unit according to one embodiment of the present disclosure;

FIG. 7 is a partial cross-section view of a coupling state of the turnbuckle unit according to one embodiment of the present disclosure;

FIG. 8 is a plan view of a main pole member according to one embodiment of the present disclosure; and FIG. 9 is a plan view of the branch unit according to one embodiment of the present disclosure.

DETAILED DESCRIPTION OF THE EMBODIMENTS

Hereinafter, embodiments of catenary structure equipment and a construction method of the same according to the present disclosure will be described with reference to the accompanying drawings. Here, the embodiments are not construed as limiting the present disclosure. Further, detailed descriptions about publicly known functions or structures may be omitted to avoid clouding the gist of the present disclosure.

Referring to FIG. 1 to FIG. 9, a tension controlling apparatus for catenary structure equipment according to one embodiment of the present disclosure adjusts tension of a horizontal wire horizontally arranged between two main pole units installed at a certain distance in an interior space of a concrete structure 1.

Here, two main pole units are installed at a certain distance in the interior space of the concrete structure 1. The two main pole units may include a first main pole unit 10*a* for supporting one side of the horizontal wire 20, and a second main pole unit 10*b* for supporting the other side of the horizontal wire 20.

The main pole unit may include a main pole member 15 protruding from the ceiling of the concrete structure 1. The main pole unit may couple with a branch unit 30 (to be described later) which is movable up and down.

Further, the horizontal wire 20 is horizontally arranged between two adjacent main pole units. The horizontal wire 20 may be horizontally arranged between the first main pole unit 10*a* and the second main pole unit 10*b*.

The horizontal wire 20 may include a first horizontal wire 20*a*, and a second horizontal wire 20*b* arranged in parallel with the first horizontal wire 20*a*. In other words, the horizontal wire 20 may form two rows, and be horizontally arranged between the first main pole unit 10*a* and the second main pole unit 10*b*.

According to one embodiment of the present disclosure, the horizontal wire 20 includes two wires, i.e. the first horizontal wire 20*a* and the second horizontal wire 20*b*, but not limited thereto. Alternatively, the number of horizontal wires 20 may be varied.

The horizontal wire 20 may be made of metal, for example, steel. As a member for the horizontal wire 20, a wire rope may be used, but not limited thereto. A member and material for the horizontal wire 20 may be replaced by a member and material which can have a flexible structure for absorbing a shaking.

The horizontal wire 20 may be formed with a ring at an end thereof by a ring forming member 21.

For instance, the end of the horizontal wire 20 is curved to form a ring at one side thereof, and the curved end of the horizontal wire 20 and the main wire of the horizontal wire 20 are coupled by the ring forming member 21, thereby forming the ring at the end of the horizontal wire 20.

In more detail, the ring forming member 21 may include a wire receiving bracket which receives the curved end of the horizontal wire 20 and the main wire of the horizontal wire 20, a wire supporting bracket which is arranged to face the wire receiving bracket and supports the curved end of the horizontal wire 20 and the main wire of the horizontal wire 20, and a bracket joining member which joins the wire receiving bracket and the wire supporting bracket together by screw coupling.

According to one embodiment of the present disclosure, the tension controlling apparatus for the catenary structure equipment includes a starter unit 40, and a turnbuckle unit 50.

The starter unit 40 is connected to the first main pole unit 10*a* of the two adjacent main pole units. The starter unit 40 connects with one end of the horizontal wire 20.

The starter unit 40 may include a starter bracket 41 which is connected to the first main pole unit 10*a*, and a starter connection member 43 which couples with the starter bracket 41 and to which the horizontal wire 20 is connected. Here, the starter connection member 43 may include a first starter connection member to couple with the first horizontal wire 20*a*, and a second starter connection member to couple with the second horizontal wire 20*b*.

The starter bracket 41 may include a first starter plate 411 connected to the first main pole unit 10*a*; a second starter plate 412 bent from the first starter plate 411; and a fourth starter plate 414 bent from the second starter plate 412, parallel with the first starter plate 411, and connected to the first main pole unit 10*a*. With this, the starter connection member 43 can be connected to the second starter plate 412.

The starter bracket 41 may further include a third starter plate 413 which is bent from the second starter plate 412 to be supported facing the second starter plate 412, and from which the fourth starter plate 414 is bent. With this, the starter connection member 43 may be connected to an overlapped portion between the third starter plate 413 and the second starter plate 412.

The starter connection member 43 may include a wire connection part 431 to which the horizontal wire 20 is connected; a starter connection bolt 432 which passes through the overlapped portion between the second starter plate 412 and the third starter plate 413; and a starter connection nut 433 which is screw-coupling with the starter connection bolt 432 to fasten the wire connection part 431 to the starter bracket.

Here, the wire connection part 431 may be formed with a wire through hole through which the horizontal wire 20 passes to form a ring. The wire connection part 431 is not limited to this embodiment. Alternatively, the wire connection part 431 may have any structure as long as it couples with the ring of the horizontal wire 20.

The starter unit 40 may further include a starter shaft member 42 which makes the starter bracket 41 couple with the starter branch member 30a of the branch unit (to be described later) at various angles in a horizontal direction. With this, the starter bracket 41 can be swiveled around the starter shaft member 42 against the starter branch member 30a of the branch unit (to be described later).

The starter shaft member 42 may include a starter swivel bolt 421 which is supported on the starter bracket 41 and passes through the starter bracket 41 and the starter branch member 30a.

Further, the starter shaft member 42 may additionally include a starter swivel nut 422 which is screw-coupled to an end of the starter swivel bolt 421 to be supported on the starter bracket 41.

The turnbuckle unit 50 is connected to the second main pole unit 10b of the two adjacent main pole units. The turnbuckle unit 50 couples with the other end of the horizontal wire 20. With this, the turnbuckle unit 50 can adjust the tension of the horizontal wire 20.

The turnbuckle unit 50 may include a turnbuckle bracket 51 which is connected to the second main pole unit 10b; a turnbuckle connection member 53 which is connected to the turnbuckle bracket 51 and movable forward and backward along a lengthwise direction of the horizontal wire 20 and to which the horizontal wire 20 is connected; and a tension adjuster 54 which is connected to the turnbuckle bracket 51 and moves the turnbuckle connection member 53 along the lengthwise direction of the horizontal wire 20 to adjust the tension of the horizontal wire 20.

Here, the turnbuckle connection member 53 may include a first turnbuckle connection member to which the first horizontal wire 20a is connected, and a second turnbuckle connection member to which the second horizontal wire 20b is connected.

Further, the tension adjuster 54 may include a first tension adjuster which adjusts the tension of the first horizontal wire 20a by moving the first turnbuckle connection member, and a second tension adjuster which adjust the tension of the second horizontal wire 20b by moving the second turnbuckle connection member.

Here, the turnbuckle bracket 51 may include a first turnbuckle plate 511, a second turnbuckle plate 512, a third turnbuckle plate 513, and a fourth turnbuckle plate 514.

The first turnbuckle plate 511 is connected to the second main pole unit 10b. The first turnbuckle plate 511 may be formed with a wire coupling slit 511a which penetrates the first turnbuckle plate 511 and through which the turnbuckle connection member 53 is exposed. The wire coupling slit 511a may be formed longitudinally along the forward and backward moving direction of the turnbuckle connection member 53. The wire coupling slit 511a allows a wrench, a driver or the like tool to be inserted therein so that the tool can meet the turnbuckle connection member 53.

The second turnbuckle plate 512 is bent from the first turnbuckle plate 511. The second turnbuckle plate 512 may support one side of the tension adjuster 54, i.e. one side of an adjustment screw 541 (to be described later) to be rotatable.

The third turnbuckle plate 513 is bent from the second turnbuckle plate 512 and parallel with the first turnbuckle plate 511. The third turnbuckle plate 513 is connected to the second main pole unit 10b. In this case, the third turnbuckle plate 513 may be formed with a tension adjustment slit 544 along which the turnbuckle connection member 53 can move forward and backward. The tension adjustment slit 544 may be formed longitudinally along the forward and backward moving direction of the turnbuckle connection member 53. The tension adjustment slit 544 may be arranged to face the wire coupling slit.

The fourth turnbuckle plate 514 is arranged to face the second turnbuckle plate 512 and connects the first turnbuckle plate 511 and the third turnbuckle plate 513. The fourth turnbuckle plate 514 may support the other side of the tension adjuster 54, i.e. the other side of the adjustment screw 541 (to be described later) to be rotatable. Here, the fourth turnbuckle plate 514 may be fitted to coupling slits 51a formed in the first turnbuckle plate 511 and the third turnbuckle plate 513.

Further, the turnbuckle connection member 53 may include a coupling bolt 531 which is inserted to be movable forward and backward in the tension adjustment slit 544 as coupling with the tension adjuster 54, and a finishing nut 533 which couples with the coupling bolt 531.

The finishing nut 533 may make the horizontal wire 20 couple with the coupling bolt 531. Thus, the ring of the horizontal wire 20 is connected to an exposed portion of the coupling bolt 531 passed through the tension adjustment slit 544, and the finishing nut 533 is screw-coupled to the coupling bolt 531 in the state that the ring of the horizontal wire 20 is arranged between a pair of finishing nuts 533, so that the horizontal wire 20 can be coupled to the turnbuckle connection member 53. In this embodiment, one pair of finishing nuts 533 are provided, but not limited thereto. Alternatively, the finishing nut 533 may be provided in the singular.

Further, the finishing nut 533 couples with and allows the coupling bolt 531 to slide in the turnbuckle bracket 51. In this case, the coupling bolt 531 is inserted in the ring of the horizontal wire 20.

The turnbuckle connection member 53 may further include a sliding supporter 532 that makes the coupling bolt 531 and the finishing nut 533 smoothly slide in the turnbuckle bracket 51. The sliding supporter 532 may be interposed between a nut bracket 543 (to be described later) of the tension adjuster 54 and the third turnbuckle plate 513 of the turnbuckle bracket 51.

Further, when the finishing nut 533 forms a pair, the sliding supporter 532 may be interposed between the third turnbuckle plate 513 of the turnbuckle bracket 51 and the finishing nut 533. Further, when the single finishing nut 533 is provided, the horizontal wire 20 may be supported between the sliding supporter 532 and the finishing nut 533, and the sliding supporter 532 may be arranged between the third turnbuckle plate 513 of the turnbuckle bracket 51 and the ring of the horizontal wire 20.

Further, when the single finishing nut 533 is provided, the sliding supporter 532 may be arranged between the third turnbuckle plate 513 of the turnbuckle bracket 51 and the finishing nut 533.

The turnbuckle connection member 53 may further include a washer part 534 to improve coupling between the coupling bolt 531 and the nut bracket 543 (to be described later) of the tension adjuster 54.

The washer part 534 may be arranged between the head of the coupling bolt 531 and the nut bracket 543 (to be described later) of the tension adjuster 54, and improve the screw-coupling between the coupling bolt 531 and the nut bracket 543 (to be described later) of the tension adjuster 54.

Further, the tension adjuster 54 may include the adjustment screw 541 which is rotatably connected to the turnbuckle bracket 51, a screw turning part 542 which couples with the adjustment screw 541 to turn the adjustment screw 541, and the nut bracket 543 which is screw-connected to the adjustment screw 541 as coupling with the turnbuckle connection member 53.

One side of the adjustment screw 541 is rotatably supported on the second turnbuckle plate 512, and the other side of the adjustment screw 541 is rotatably supported on the fourth turnbuckle plate 514.

One end of the adjustment screw 541 couples with a screw grip part 546, and the other end of the adjustment screw 541 is provided with the screw turning part 542.

The screw grip part 546 protrudes from the second turnbuckle plate 512, and a screw supporter 547 is arranged between the screw grip part 546 and the second turnbuckle plate 512. The screw supporter 547 stabilizes the screw-coupling between the adjustment screw 541 and the screw grip part 546 when the adjustment screw 541 is turned, and makes the adjustment screw 541 be smoothly turned.

The turnbuckle unit 50 may further include a turnbuckle shaft member 52 which allows the turnbuckle bracket 51 to couple with a turnbuckle branch member 30b of the branch unit (to be described later) at various angles along to the horizontal direction. With this, the turnbuckle bracket 51 can swivel in the turnbuckle branch member 30b of the branch unit (to be described later) by the turnbuckle shaft member 52 in the horizontal direction.

The turnbuckle shaft member 52 may further include a turnbuckle swivel bolt 521 which is supported on the turnbuckle bracket 51 and passes through the turnbuckle bracket 51 and the turnbuckle branch member 30b.

Further, the turnbuckle shaft member 52 may additionally include a turnbuckle swivel nut 522 screw-coupling with the end of the turnbuckle swivel bolt 521 to be supported on the turnbuckle bracket 51.

According to one embodiment of the present disclosure, the tension controlling apparatus for the catenary structure equipment may further include the branch unit 30.

The branch unit 30 slides up and down as coupling with the main pole unit. The branch unit 30 may include the starter branch member 30a which couples with the first main pole unit 10a to slide up and down, and the turnbuckle branch member 30b which couples with the second main pole unit 10b to slide up and down. Thus, the starter branch member 30a may couple with the starter unit 40, and the turnbuckle branch member 30b may couple with the turnbuckle unit 50.

The branch unit 30 may include a branch bracket 31 which is movable up and down in the main pole unit, a bracket fastener 33 which makes the branch bracket 31 be detachably fastened to the main pole unit, and a swivel-coupling member 34 which is provided in the branch bracket 31. The swivel-coupling member 34 may couple with the starter unit 40 or the turnbuckle unit 50.

The branch bracket 31 is shaped like a ring to surround and support the main pole unit.

Here, the bracket fastener 33 is provided in the plural, and thus prevents the branch bracket 31 from being crushed in the main pole unit or prevents the branch bracket from being gapped in the main pole unit. Further, a member pressing portion 153 may be provided in the plural corresponding to the number of bracket fasteners 33.

Here, the main pole unit may include an adjustment guide 151 recessed or protruding longitudinally along the lengthwise direction of the main pole unit to form a vertical sliding path of the branch unit 30. The adjustment guide 151 may be longitudinally formed on the lateral surfaces of the main pole member 15 in the vertical direction. The adjustment guide 151 may be arranged in the plural to be spaced apart from each other.

The main pole unit may be formed with a main pole fastening part 152 penetrated or recessed thereon to which a main pole fastening member is screw-coupled to be installed on the ceiling of the concrete structure 1. The main pole fastening part 152 may be provided on the top surface of the main pole member 15.

The main pole unit may include the member pressing portion 153 with which the swivel-coupling member 34 of the branch unit 30 is in close-contact. The member pressing portion 153 may be longitudinally formed in the vertical direction on the lateral surfaces of the main pole member 15 as spaced apart from the adjustment guide 151.

The branch unit 30 may further include a slider 32 which protrudes from or recessed on the branch bracket 31 and slides along the adjustment guide 151 as fitted to the adjustment guide 151. The slider 32 may be provided in the singular or in the plural to be spaced apart from each other.

According to one embodiment of the present disclosure, in case that the adjustment guide 151 is shaped like a groove, the width of the adjustment guide 151 at the entrance may be narrower than the width of the adjustment guide 151 at the bottom with respect to the width direction of the groove.

Further, when the adjustment guide 151 shaped like a groove and the slider 32 shaped like a projection are fitted to each other, the slider 32 can smoothly slide in the adjustment guide 151 and be prevented from being separated from the entrance of the adjustment guide 151. Further, when the branch unit 30 moves up and down in the main pole unit, the branch unit 30 is prevented from swing in the main pole unit.

Further, when the slider 32 has a projection shape corresponding to the shape of the adjustment guide 151, a connection part between the branch bracket 31 and the slider 32 corresponds to the entrance of the adjustment guide 151, and a free end of the slider 32 corresponds to the bottom of the adjustment guide 151 with respect to the width direction of the projection.

Although the adjustment guide 151 is shaped like a projection and the slider 32 is shaped like a groove, the same effects are expected.

The coupling state of the branch unit 30 in the main pole unit is as follows. When the bracket fastener 33 is screw-connected to the branch bracket 31, the bracket fastener 33 may press the member pressing portion 153 at a lateral side of the main pole unit. Thus, the bracket fastener 33 fastens the branch bracket 31 to the main pole unit.

When the bracket fastener 33 is released from the screw-coupling with the branch bracket 31, the bracket fastener 33 does not press the member pressing portion 153 at the lateral side of the main pole unit. Thus, the branch bracket 31 is movable along the lengthwise direction of the main pole unit.

The swivel-coupling member 34 may couple with the starter unit 40 at multi-angles in the horizontal direction by the starter shaft member 42. Further, the swivel-coupling member 34 may couple with the turnbuckle unit 50 at multi-angles in the horizontal direction by the turnbuckle shaft member 52.

Thus, the swivel-coupling member 34 is formed with a swivel hole 341 in which the starter shaft member 42 or the turnbuckle shaft member 52 is inserted and supported.

With this, the starter bracket 41 can be connected to the swivel-coupling member 34 provided in the starter branch member 30a by the starter shaft member 42 at various angles. In more detail, the top and bottom of the swivel-coupling member 34 provided in the starter branch member 30a respectively support the first starter plate 411 and the fourth starter plate 414.

In addition, the starter shaft member 42 passes through the first starter plate 411, the swivel-coupling member 34 and the fourth starter plate 414 in sequence, thereby allowing the starter bracket 41 to swivel around the starter branch member 30a.

Further, the turnbuckle bracket 51 can be connected to the swivel-coupling member 34 provided in the turnbuckle branch member 30b by the turnbuckle shaft member 52 at various angles. In more detail, the top and bottom of the swivel-coupling member 34 provided in the turnbuckle branch member 30b support the first turnbuckle plate 511 and the third turnbuckle plate 513, respectively. In addition, the turnbuckle shaft member 52 passes through the first turnbuckle plate 511, the swivel-coupling member 34 and the third turnbuckle plate 513 in sequence, thereby allowing the turnbuckle bracket 51 to swivel around the turnbuckle branch member 30b.

According to one embodiment of the present disclosure, the tension controlling apparatus for the catenary structure equipment may further include a damper unit 70.

The damper unit 70 connects the horizontal wire 20 and the starter unit 40 to adjust the tension.

The damper unit 70 may include a damper spring 74 of a coil type. A first damping hook 741 may be extended from one end of the damper spring 74 and couple with the wire connection unit (i.e. the starter unit 40), and a second damping hook 742 may be extended from the other end of the damper spring 74 and couple with the horizontal wire 20.

The damper unit 70 may further include a first cylinder 71, and a second cylinder 72. In more detail, the damper unit 70 may include the damper spring 74 which connects the horizontal wire 20 and the starter unit 40 or connects the horizontal wire 20 and the turnbuckle unit 50; the first cylinder 71 supported on one side of the damper spring 74; and the second cylinder 72 supported on the other side of the damper spring 74.

In this case, the second cylinder 72 is inserted to slide in the first cylinder 71. The first cylinder 71 may be formed with a first hook through hole 711 through which the second damping hook 742 passes. With this, the first cylinder 71 partially surrounds and supports the second cylinder 72.

The second cylinder 72 partially or entirely surrounds and supports the damper spring 74. The second cylinder 72 may be formed with a second hook through hole 721 through which the first damping hook 741 passes.

The damper unit 70 may further include a scale mark 73 on the circumferential surface of the second cylinder 72. With this, the first cylinder 71 may expose or cover the scale mark 73 in accordance with a stretched extent of the damper spring 74, and it is thus possible to check the stretched extent of the damper spring 74 with naked eyes.

According to one embodiment of the present disclosure, the damper unit 70 is used together with the turnbuckle unit 50, and it is therefore possible to check the adjusted tension of the horizontal wire 20 in accordance with an exposed degree of the scale mark 73.

According to one embodiment of the present disclosure, the reference numeral of '60' indicates a connection holder that connects the ceiling of the concrete structure 1 and the horizontal wire 20 in between two adjacent main pole units and prevents the horizontal wire 20 from sagging. The connection holder 60 may be provided in the plural to be spaced apart from each other along the lengthwise direction of the horizontal wire 20. The connection holder 60 may include a wire rope. The wire rope may be made of metal, for example, steel, but not limited thereto. The material for the wire rope may be replaced by any material as long as it can have a flexible structure capable of absorbing a shaking.

Further, the reference numeral of '80' indicates a main pole end cap to be coupled to the bottom of the main pole member 15. The main pole end cap 80 refers to an enclosure with the bottom and lateral surfaces to form a branch space.

Further, the reference numeral of '81 indicates a detachable cover 81 detachably coupled to the lateral side of the main pole end cap 80, and the reference numeral of '82' indicates an cut-open slit formed to penetrate the lateral side of the main pole end cap 80 so that the detachable cover 81 can be separated from the lateral side of the main pole end cap 80.

Further, the reference numeral of '90' indicates a free cover 90 that connects the main pole end caps 80 provided between the two adjacent main pole units. The free cover 90 is shaped like a channel, supports wiring (not shown), and prevents the wiring (not shown) from being exposed to the outside. The free cover 90 may be coupled to the horizontal wire 20 by a separate hanger member (not shown) or as being spaced apart from the ceiling of the concrete structure 1.

Further, the reference numeral of '100' indicates a lighting unit that emits light with supplied power. The lighting unit 100 may include a lighting main body to which a lamp for emitting light is coupled, and a lighting socket which is coupled to a lengthwise end of the lighting main body. The lighting main body is formed with a coupling hook for coupling with the horizontal wire 20. Thus, the horizontal wire 20 is accommodated in a wire receiving portion recessed in the coupling hook, so that the lighting unit 100 can be coupled to the horizontal wire 20.

In the tension controlling apparatus for the catenary structure equipment according to the present disclosure, it is possible to adjust the tension of the horizontal wire horizontally arranged between the two main pole units, and it is easy to adjust the position of the lighting unit.

Further, by the turnbuckle unit and the damper unit, the tension of the horizontal wire is adjusted to make the length of the horizontal wire be varied within a predetermined range, and the load applied to the horizontal wire is distributed to fundamentally make the lighting unit be free from shaking and impact.

Further, by the scale mark provided in the damper unit, it is possible to check the tension of the horizontal wire, to control the stretched extent of the damper spring, and to protect the damper unit and prevent safety accidents.

Further, by the detailed coupling structure of the turnbuckle unit, it is possible to mechanically and cleanly make the turnbuckle connection member for adjusting the tension of the horizontal wire be moved forward and backward, and to stabilize the coupling between the turnbuckle connection member and the tension adjuster.

Further, by the detailed coupling structure of the turnbuckle unit, it is possible to make the second main pole unit and the horizontal wire be easily connected, to secure a stable support of the adjustment screw, and to prevent the turnbuckle bracket from being deformed as the adjustment screw is turned.

Further, by the structure of the branch unit, it is possible to move the turnbuckle unit up and down in the second main pole unit, thereby adjusting the installation height of the horizontal wire.

Further, by the structure of the branch unit, the turnbuckle unit is coupled at various angles in the horizontal direction in the second main pole unit, thereby securing the shortest distance between the first main pole unit and the second main pole unit for installing the horizontal wire, and making it possible to adjust the installation direction of the turnbuckle unit.

Further, by the structure of the starter unit, it is possible to make the first main pole unit and the horizontal wire be easily coupled, and to prevent the starter unit from being deformed as the tension of the horizontal wire is adjusted.

Further, by the structure of the branch unit, it is possible to move the starter unit up and down in the first main pole unit, thereby adjusting the installation height of the horizontal wire.

Further, by the structure of the branch unit, the starter unit is coupled at various angles in the horizontal direction in the second main pole unit, thereby securing the shortest distance between the first main pole unit and the second main pole unit for installing the horizontal wire, and making it possible to adjust the installation direction of the starter unit.

Although a few exemplary embodiments of the present disclosure have been shown and described, it will be appreciated by those skilled in the art that changes may be made in these embodiments without departing from the principles and spirit of the disclosure, the scope of which is defined in the appended claims and their equivalents.

What is claimed is:

1. A tension controlling apparatus for catenary structure equipment, which adjusts tension of a horizontal wire horizontally arranged between main pole units installed at a certain distance in an interior space of a concrete structure, the tension controlling apparatus comprising:
    a starter unit which is connected to a first main pole unit of two adjacent main pole units, and connects with a first end of the horizontal wire; and
    a turnbuckle unit which is connected to a second main pole unit of two adjacent main pole units, connects with a second end of the horizontal wire, and adjusts the tension of the horizontal wire,
    the turnbuckle unit comprising:
    a turnbuckle bracket configured to be connected to the second main pole unit;
    a turnbuckle connection member configured to move forward and backward in the turnbuckle bracket along a lengthwise direction of the horizontal wire and connects with the horizontal wire; and
    a tension adjuster configured to couple with the turnbuckle bracket, and move the turnbuckle connection member along the lengthwise direction of the horizontal wire to adjust the tension of the horizontal wire.

2. The tension controlling apparatus according to claim 1, further comprising a damper unit configured to connect a first side of the horizontal wire and the starter unit and adjust the tension of the horizontal wire.

3. The tension controlling apparatus according to claim 2, wherein the damper unit comprises
    a damper spring configured to connect the horizontal wire and the starter unit;
    a first cylinder configured to be supported at a first side of the damper spring;
    a second cylinder configured to be supported at a second side of the damper spring and inserted to slide in the first cylinder; and
    a scale mark configured to be formed on a circumferential surface of the second cylinder to check, correct and manage a stretched extent of the damper spring.

4. The tension controlling apparatus according to claim 1, wherein the tension adjuster comprises
    an adjustment screw configured to rotatably couple with the turnbuckle bracket;
    a screw turning part configured to couple with the adjustment screw to turn the adjustment screw;
    a nut bracket configured to screw-couple with the adjustment screw as coupling with the turnbuckle connection member, and
    a tension adjustment slit configured to penetrate through the turnbuckle bracket to allow the turnbuckle connection member move forward and backward.

5. The tension controlling apparatus according to claim 4, wherein the turnbuckle bracket comprises
    a first turnbuckle plate configured to be connected to the second main pole unit;
    a second turnbuckle plate configured to be bent from the first turnbuckle plate and support a first side of the adjustment screw to be rotatable;
    a third turnbuckle plate configured to be bent from the second turnbuckle plate and parallel with the first turnbuckle plate, be connected to the second main pole unit, and comprising the tension adjustment slit penetrating therethrough; and
    a fourth turnbuckle plate configured to connect the first turnbuckle plate and the third turnbuckle plate to face the second turnbuckle plate, and support a second side of the adjustment screw to be rotatable.

6. The tension controlling apparatus according to claim 1, further comprising a turnbuckle branch member configured to be connected to and slide up and down in the second main pole unit, and couple with the turnbuckle unit.

7. The tension controlling apparatus according to claim 6, wherein the turnbuckle unit further comprises a turnbuckle shaft member configured to make the turnbuckle bracket be connected to the turnbuckle branch member at various angles in a horizontal direction.

8. The tension controlling apparatus according to claim 1, wherein the starter unit comprises
    a starter bracket configured to be connected to the first main pole unit; and
    a starter connection member configured to couple with the starter bracket and connect with the horizontal wire.

9. The tension controlling apparatus according to claim 8, wherein the starter bracket comprises
    a first starter plate configured to be connected to the first main pole unit;
    a second starter plate configured to be bent from the first starter plate; and
    a fourth starter plate configured to be bent from the second starter plate and parallel with the first starter plate, and be connected to the first main pole unit.

10. The tension controlling apparatus according to claim 8, further comprising a starter branch member configured to be connected to and slide up and down in the first main pole unit, and couple with the starter unit.

11. The tension controlling apparatus according to claim 10, wherein the starter unit further comprises a starter shaft member configured to make the starter bracket be connected to the starter branch member at various angles in a horizontal direction.

* * * * *